United States Patent
Chomka et al.

[11] Patent Number: 6,063,634
[45] Date of Patent: May 16, 2000

[54] FLUID ASSEMBLY AND METHOD FOR DIAGNOSTIC INSTRUMENT

[75] Inventors: Chester Chomka, Bellevue, Iowa; Ted Hanagan, Libertyville, Ill.; Stacie Lynn Hoskins; Steven C. Peake, both of Dubuque, Iowa; Arthur D. Rokusek, Peosta, Iowa; Scott G. Safar, Pleasant Praire, Wis.; John Willmes, Dubuque, Iowa

[73] Assignee: Abbott Laboratories, Abbott Park, Ill.

[21] Appl. No.: 09/053,204

[22] Filed: Apr. 1, 1998

[51] Int. Cl.⁷ .................................................. G01N 35/10
[52] U.S. Cl. .............................. 436/54; 436/50; 436/180; 422/63; 422/67; 422/100; 422/106
[58] Field of Search .............................. 422/63, 100, 102, 422/103, 104, 105, 106, 112; 436/43, 49, 50, 174, 180; 222/30, 64

[56] References Cited

U.S. PATENT DOCUMENTS

| | | |
|---|---|---|
| 1,919,858 | 7/1933 | Pettingill . |
| 2,129,944 | 9/1938 | Ladewig . |
| 2,173,986 | 9/1939 | Stuart . |
| 2,192,094 | 2/1940 | Moore . |
| 2,811,202 | 10/1957 | Schild et al. . |
| 2,851,655 | 9/1958 | Haddad . |
| 3,186,799 | 6/1965 | Hach . |
| 3,186,800 | 6/1965 | Strickler . |
| 3,273,402 | 9/1966 | Farr . |
| 3,308,041 | 3/1967 | Strickler . |
| 3,432,271 | 3/1969 | Wasilewski . |
| 3,447,906 | 6/1969 | Zimmerli . |
| 3,476,518 | 11/1969 | Jungner . |
| 3,481,709 | 12/1969 | Slone . |
| 3,488,154 | 1/1970 | Hronas . |
| 3,549,994 | 12/1970 | Rothermel et al. . |
| 3,578,408 | 5/1971 | Sirois et al. . |
| 3,607,092 | 9/1971 | Neff et al. . |
| 3,690,833 | 9/1972 | Ferrari . |
| 3,752,197 | 8/1973 | Ambrose et al. . |
| 3,800,984 | 4/1974 | Phelan . |
| 3,865,549 | 2/1975 | Riley . |
| 3,950,137 | 4/1976 | Larson et al. . |
| 3,987,808 | 10/1976 | Carbonell et al. . |
| 3,990,853 | 11/1976 | Godin . |

(List continued on next page.)

FOREIGN PATENT DOCUMENTS

| | | | |
|---|---|---|---|
| 0278520 | 8/1988 | European Pat. Off. | ......... G01N 1/28 |
| 0311588 | 4/1989 | European Pat. Off. | ....... G01N 15/10 |
| 0388018 | 9/1990 | European Pat. Off. | ....... G01N 35/00 |
| 0754491 | 1/1997 | European Pat. Off. | . |
| 7280691 | 10/1995 | Japan | ............... G01M 3/16 |
| 8146011 | 6/1996 | Japan | ............ G01N 35/10 |

OTHER PUBLICATIONS

International Search Report from PCT/US 99/05793.
Patent Abstract Of Japan, pub. 07280691, vol. 96, No. 02, Oct. 27, 1995.
Patent Abstract Of Japan, pub. 08146011, vol. 96, No. 10, Jun. 7, 1996.
International Search Report from PCT/US99/02857.

*Primary Examiner*—Long V. Le
*Attorney, Agent, or Firm*—Mark C. Bach

[57] ABSTRACT

A fluid assembly and a method are provided. In one embodiment, the fluid assembly is insertable into a container holding a first fluid to be supplied to a diagnostic instrument and comprises a first element, a second element, and a first conduit fluidly connected between the first element and the second element such that the first fluid in the container moves through the first conduit towards the diagnostic instrument. A second conduit containing a second fluid is fluidly connected between the first element and the second element. A pressure transducer is fluidly connected with the second conduit such that the second fluid is bounded within the second conduit by the first fluid and the pressure transducer. The pressure transducer monitors pressure of the second fluid to indicate a volume of the first fluid in the container.

5 Claims, 9 Drawing Sheets

U.S. PATENT DOCUMENTS

| | | |
|---|---|---|
| 4,013,413 | 3/1977 | Stewart et al. . |
| 4,029,473 | 6/1977 | Sharples . |
| 4,106,671 | 8/1978 | Sharples . |
| 4,108,608 | 8/1978 | Maher, Jr. et al. . |
| 4,120,657 | 10/1978 | Nagy et al. . |
| 4,120,661 | 10/1978 | Naono . |
| 4,220,621 | 9/1980 | Simpson et al. . |
| 4,223,558 | 9/1980 | Schmider et al. . |
| 4,244,919 | 1/1981 | Chen . |
| 4,252,769 | 2/1981 | Hood et al. . |
| 4,263,406 | 4/1981 | Bostik et al. . |
| 4,283,201 | 8/1981 | DeFord et al. . |
| 4,323,537 | 4/1982 | Mody . |
| 4,326,940 | 4/1982 | Eckles et al. . |
| 4,387,075 | 6/1983 | Morgart . |
| 4,424,276 | 1/1984 | Clark et al. . |
| 4,441,374 | 4/1984 | Suzuki . |
| 4,451,433 | 5/1984 | Yamashita et al. . |
| 4,483,927 | 11/1984 | Takekawa . |
| 4,520,108 | 5/1985 | Yoshida et al. . |
| 4,610,848 | 9/1986 | Weber . |
| 4,623,008 | 11/1986 | Shibata et al. . |
| 4,640,821 | 2/1987 | Mody et al. . |
| 4,737,342 | 4/1988 | Herrmann et al. . |
| 4,746,491 | 5/1988 | Ohlin . |
| 4,749,552 | 6/1988 | Sakisako et al. . |
| 4,753,775 | 6/1988 | Ebersole et al. . |
| 4,794,806 | 1/1989 | Nicoli et al. . |
| 4,818,706 | 4/1989 | Starr . |
| 4,837,161 | 6/1989 | Stevens et al. . |
| 4,859,605 | 8/1989 | Metzger et al. . |
| 4,865,992 | 9/1989 | Hach et al. . |
| 4,908,187 | 3/1990 | Holmquist et al. . |
| 4,950,610 | 8/1990 | Tittle . |
| 5,109,347 | 4/1992 | Quick, Jr. et al. . |
| 5,158,748 | 10/1992 | Obi et al. . |
| 5,192,509 | 3/1993 | Surjaatmadja et al. . |
| 5,199,606 | 4/1993 | Nutting ..................................... 222/30 |
| 5,221,521 | 6/1993 | Hashizume et al. . |
| 5,254,311 | 10/1993 | Ushikubo . |
| 5,254,313 | 10/1993 | Kuroda et al. . |
| 5,256,573 | 10/1993 | Kuroda et al. . |
| 5,279,721 | 1/1994 | Schmid . |
| 5,284,773 | 2/1994 | Kulkarni et al. . |
| 5,298,424 | 3/1994 | Shinohara . |
| 5,376,272 | 12/1994 | Spearman ................................ 210/463 |
| 5,405,585 | 4/1995 | Coassin . |
| 5,411,708 | 5/1995 | Moscetta . |
| 5,424,212 | 6/1995 | Pinsl-Ober et al. . |
| 5,447,691 | 9/1995 | Sanuki . |
| 5,447,692 | 9/1995 | Keenan et al. . |
| 5,531,964 | 7/1996 | Besnier . |
| 5,597,733 | 1/1997 | Bell et al. . |
| 5,609,822 | 3/1997 | Carey et al. . |
| 5,624,846 | 4/1997 | Hayashibe et al. . |

FLUID ASSEMBLY AND METHOD FOR DIAGNOSTIC INSTRUMENT

BACKGROUND

This case relates to a fluid assembly and a related method for use with a diagnostic instrument.

A diagnostic instrument is a machine that can perform a test on a sample, such as blood and the like, to determine something in that sample. That something, such as the AIDS virus in the sample, may be medically significant.

To perform such a test, the machine may mix the sample with a fluid, such as a reagent, a buffer, a diluent and the like. This fluid may be supplied in a fluid container, such as a bottle and the like. As the machine performs the test, the machine takes a needed amount of fluid from the fluid container. As the machine performs more and more tests, the fluid container is progressively emptied.

However, given that the tests the machine performs are important, e.g. to determine whether a person is sick or not, it is desirable that the machine be substantially continuously ready to perform those tests. This means that the machine should have a substantially constant supply of fluid. Accordingly, there is a need to provide an assembly which can be used to inform a machine operator when a certain fluid container is close to being empty so that a new, "full" fluid container can be added, etc.

SUMMARY

A fluid assembly and a method are provided. In one embodiment, the fluid assembly is insertable into a container holding a first fluid to be supplied to a diagnostic instrument and comprises a first element, a second element, and a first conduit fluidly connected between the first element and the second element such that the first fluid in the container moves through the first conduit towards the diagnostic instrument. A second conduit containing a second fluid is fluidly connected between the first element and the second element. A pressure transducer is fluidly connected with the second conduit such that the second fluid is bounded within the second conduit by the first fluid and the pressure transducer. The pressure transducer monitors pressure of the second fluid to indicate a volume of the first fluid in the container.

In one method, a first element is fluidly connected with a second element by a first conduit. The first element is fluidly connected with the second element with a second conduit containing a second fluid. A pressure transducer is fluidly connected with the second conduit. The first element, the second element, the first conduit and the second conduit are inserted into the container such that first fluid moves through the first conduit towards the diagnostic instrument. The second fluid is bounded in the second conduit by the first fluid and the pressure transducer. Pressure of the second fluid is monitored with the pressure transducer to indicate a volume of first fluid in the container.

DETAILED DESCRIPTION OF ILLUSTRATED EMBODIMENTS

Figure 6:
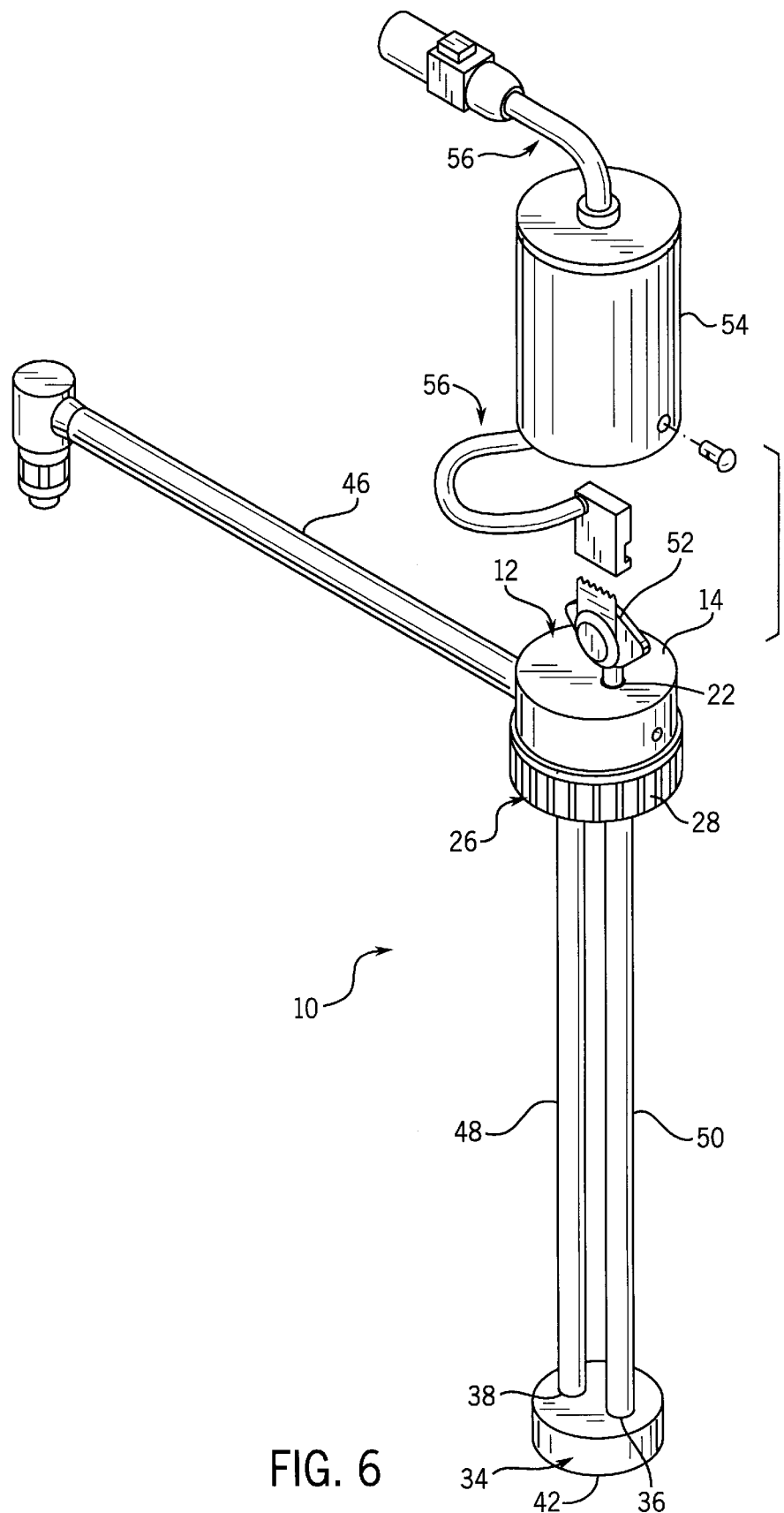
FIG. 6 is a view similar to that of FIG. 5.
Figure 13:
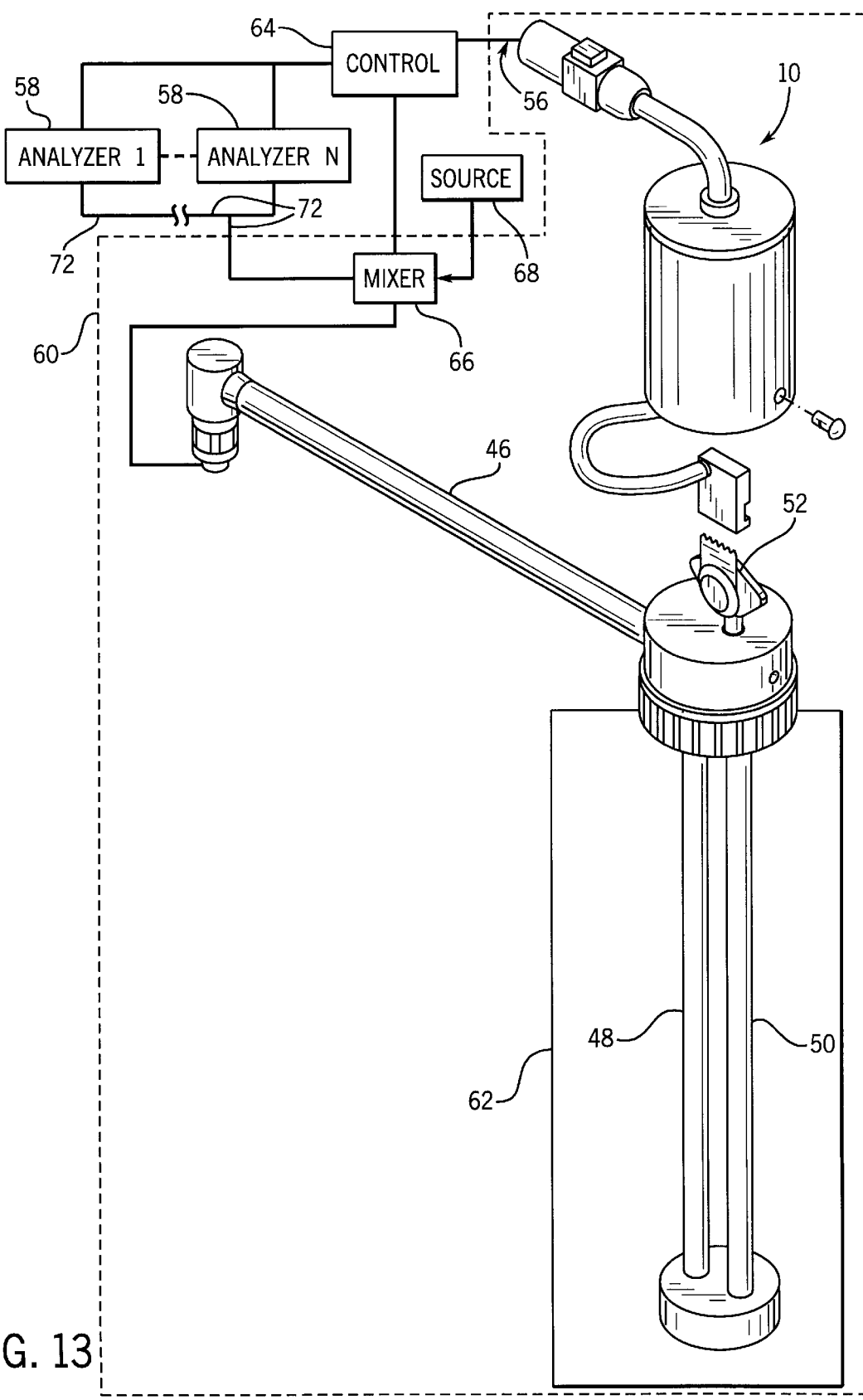
FIG. 13 is a block schematic diagram of a system including the fluid assembly.

One embodiment of a fluid assembly 10 is shown in FIGS. 6 and 13. This fluid assembly 10 may be utilized in any suitable employment or with any appropriate piece of equipment. In one instance, the fluid assembly 10 may be used with an automated analyzer 58 (FIG. 13), such as those disclosed in U.S. patent application Ser. Nos. 08/715,924, 08/715,780, 08/716,079 and 08/816,121. Those applications are assigned to the assignee of the present case and the disclosures thereof are incorporated herein in their entirety by this reference. The fluid assembly 10 may be utilized with an apparatus 60 (FIG. 13) which supplies a first fluid, which may comprise a concentrate supplied in a container 62 to be mixed with another or third fluid, such as water from a source 68, by a mixer 66, to at least one or more (1 through N), such as 4, automated analyzers 58 or other machines operatively associated with those analyzers 58. The fluid assembly 10 may supply such first fluid simultaneously to a plurality of analyzers 58. A control 64, such as a computer having a memory, such as a RAM, a ROM, a SFAM, an EPROM and the like, containing and running appropriate routines, may be operatively connected with the analyzer(s) 58 and the apparatus 60 to intendedly monitor and govern operation of those devices. It is to be recognized that the fluid assembly 10 may be modified in any suitable manner to meet particular needs. Also, methods of operation, use, etc. associated with the fluid assembly 10 are described. It is to be noted that steps comprising those methods may be performed in any appropriate order. Further, steps from one method may be combined with steps from another method to arrive at yet additional methods.

Figure 7:
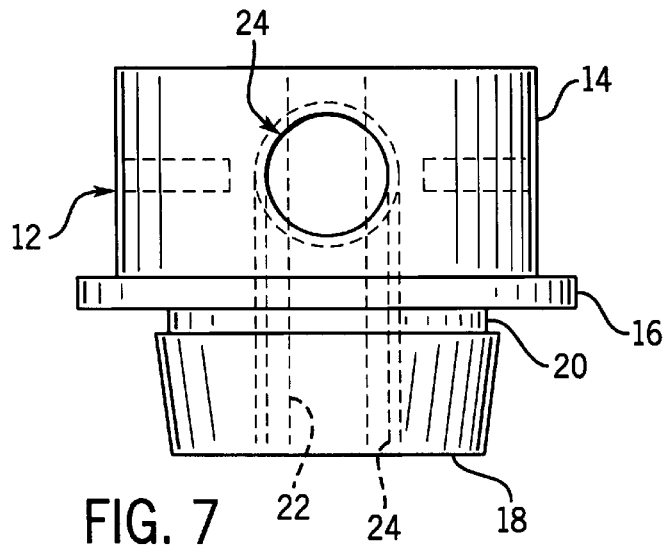
FIG. 7 is an elevational view of an element shown in FIG. 1.
Figure 8:
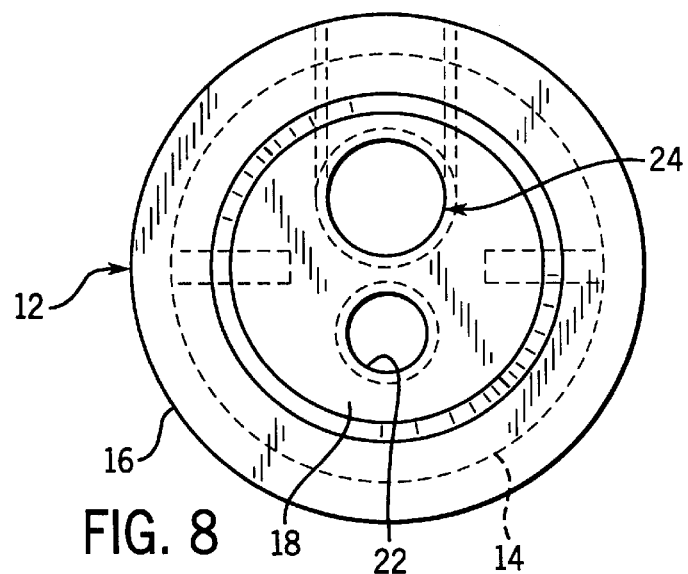
FIG. 8 is a bottom view of the element of FIG. 7.

In an exemplary embodiment, the fluid assembly 10 comprises a first element or first manifold 12 illustrated in FIGS. 7 and 8. The first manifold 12 includes a first body 14, a ledge 16 disposed on one end of the first body 14, and a second body 18 located such that the ledge 16 is between the first body 14 and the second body 18. A notch 20 is disposed between the ledge 16 and one end of the second body 18. A first bore 22 extends from an end of the first body 14, opposite to the end of the first body 14 adjacent the ledge 16, to an end of the second body 18, opposite to the end of the second body 18 adjacent the notch 20, A second bore 24 extends from an end of the second body 18, opposite to the end of the second body 18 adjacent the notch 20, and exits the first body 14 at a location offset approximately 90 degrees from a position of the first bore 22 on the first body 14.

In a particular embodiment, the first manifold 12 includes the following specifications. However, others are possible.

For instance, the first manifold 12 may be substantially cylindrical in configuration. The first body may have an outer diameter of about 1.36 inches and extend about 0.64 inches from an adjacent side of the ledge 16 which may be about 0.1 inches wide (axial length) and have an outer diameter of about 1.62 inches. The notch 20 nay be about 0.08 inches in axial length (width). The second body 18 may extend from the notch 20 by a distance measuring about 0.38 inches and may have a sloping profile, measuring about 5 degrees, tapering from an outer diameter of approximately 1.09 inches to about 1.03 inches. An end of the first bore 22 on the first body 14 may have a diameter of about 0.25 inches and a center of the first bore 22 may be offset from a centerpoint of the first body 14 by a distance measuring about 0.2 inches. An end of the second bore 24 on the first body 14, i.e. its centerpoint, may be located about 0.32 inches from the ledge 16 and have a diameter of about 0.339 inches. A centerpoint of an end of the second bore 24 located on the second body 18 may be offset by a distance of about 0.2 inches from a centerpoint of the second body 18. The first manifold 12 may be made of any suitable material, such as PVC (gray) and the like.

Figure 9:
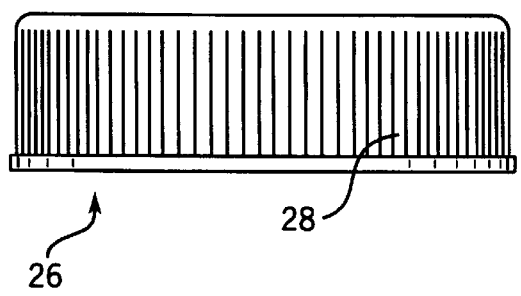
FIG. 9 is an elevational view of another element shown in FIG. 1.
Figure 10:
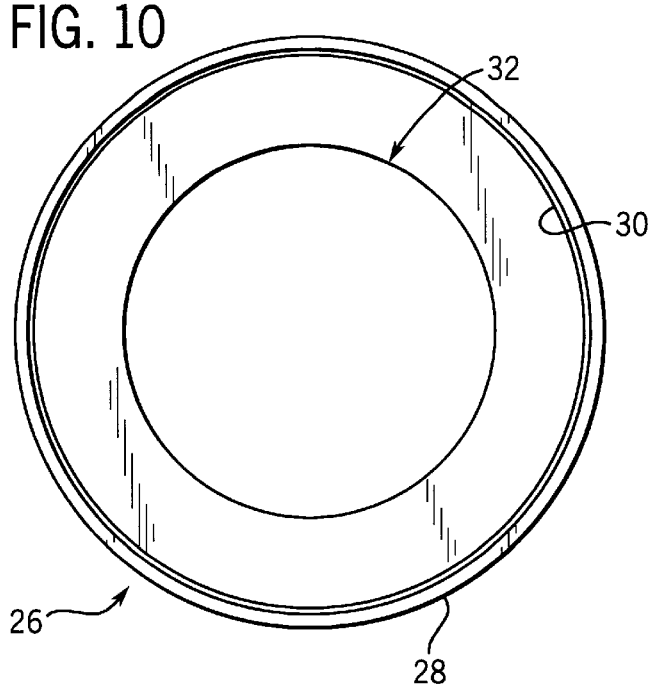
FIG. 10 is a bottom view of the element of FIG. 9.

The fluid assembly 10 also comprises a second element or ring 26, shown in FIGS. 9 and 10, which is movably engagable with the first manifold 12. The ring 26 includes a knurl 28 on its outer surface to facilitate application of force to the ring 26. The ring 26 includes threads 30 on its inner surface which are movably engagable with complimentary threads on a suitable first fluid container 62 (FIG. 13), such as a cubitainer available from Abbott Laboratories (Abbott Park, Ill.), containing a particular volume of first fluid, such as a concentrate and the like, to be supplied, possibly in a diluted or mixed form, by the fluid assembly 10. The threads 30 may be replaced with any other structure which mates with a corresponding structure on the first fluid container 32. The ring 26 also has an aperture 32 dimensioned for accepting the second body 18 of the first manifold 12.

In a particular embodiment, the ring 26 may be substantially cylindrical in shape, may have an axial length of about 0.457 inches and a diameter of about 1.59 inches. The aperture 32 may have a diameter that measures about 1.062 inches.

Figure 11:
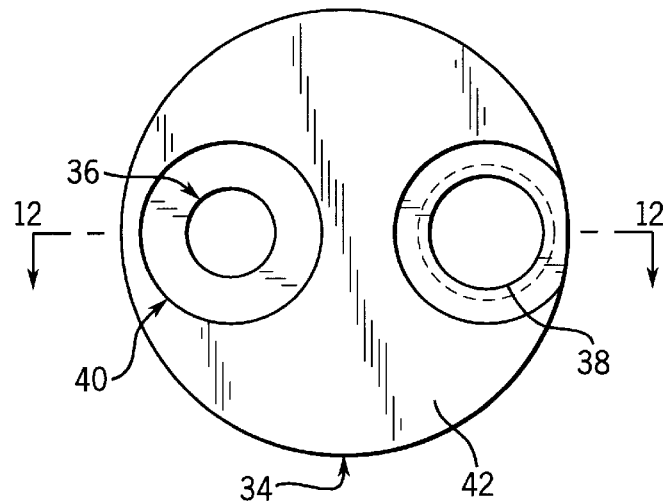
FIG. 11 is a bottom view of an additional element shown in FIG. 3.
Figure 12:
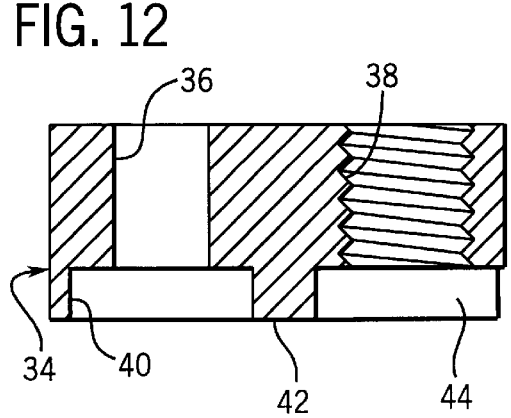
FIG. 12 is a sectional view, taken along line A—A of FIG. 11.

The fluid assembly 10 further includes a third element or second manifold 34, displayed in FIGS. 11 and 12. The second manifold 34 includes a first bore 36 and a second bore 38. Both of the bores 36 and 38 extend through the second manifold 34. A portion 40 of the first bore 36 adjacent a first fluid container 62 engaging surface 42 of the second manifold 34 is enlarged with respect to the first bore 36. A portion 44 of the second bore 38 adjacent the first fluid container 62 engaging surface 42 of the second manifold 34 is enlarged with respect to the second bore 38 such that the portion 44 is unbounded at at least one side. The portions 40 and 44 and the first fluid container 62 engaging surface 42 facilitate efficient access of the fluid assembly 10 to first fluid within a first fluid container 62 (FIG. 13) into which the fluid assembly 10 is inserted while also reducing the likelihood that a portion of that first fluid container 62 might interfere with that first fluid access.

In a particular embodiment, the second manifold 34 may have a substantially cylindrical shape, a thickness of about 0.5 inches and a diameter of about 1.188 inches. A centerline of the first bore 36 is offset from a centerpoint of the second manifold 34 by a distance of about 0.3 inches and a centerline of the second bore 38 is offset from a centerpoint of the second manifold 34 by a distance of about 0.365 inches. Terminal ends of the first and second bores 36 and 38 are offset from the container engaging surface 42 by a distance of about 0.125 inches.

To facilitate understanding of the fluid assembly 10, construction of an exemplary embodiment of the fluid assembly 10 is discussed. However, other constructions are possible.

Figure 1:
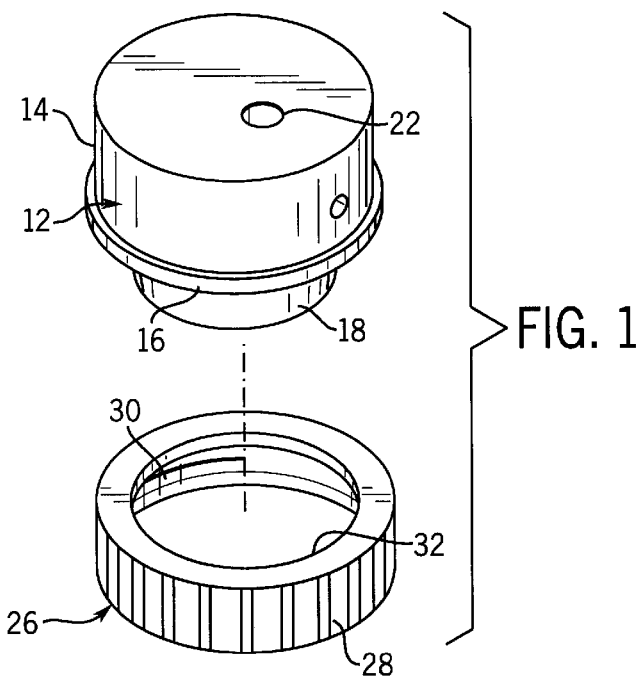
FIG. 1 is a perspective view of elements of an embodiment of a fluid assembly described herein.

Referring to FIG. 1, the first manifold 12 and the ring 26 are positioned with respect to each other such that the second body 18 is aligned with the aperture 32 in the ring 26. The first manifold 12 and the ring 26 are moved with respect to each other such that the second body 18 is positioned inside the aperture 32. This movement continues until the aperture 32 resides in the notch 20 between the second body 18 and the ledge 16. The ring 26 is free to rotate within the notch 20 about the second body 18 responsive to force applied to the knurl 28 on the ring 26.

Figure 2:
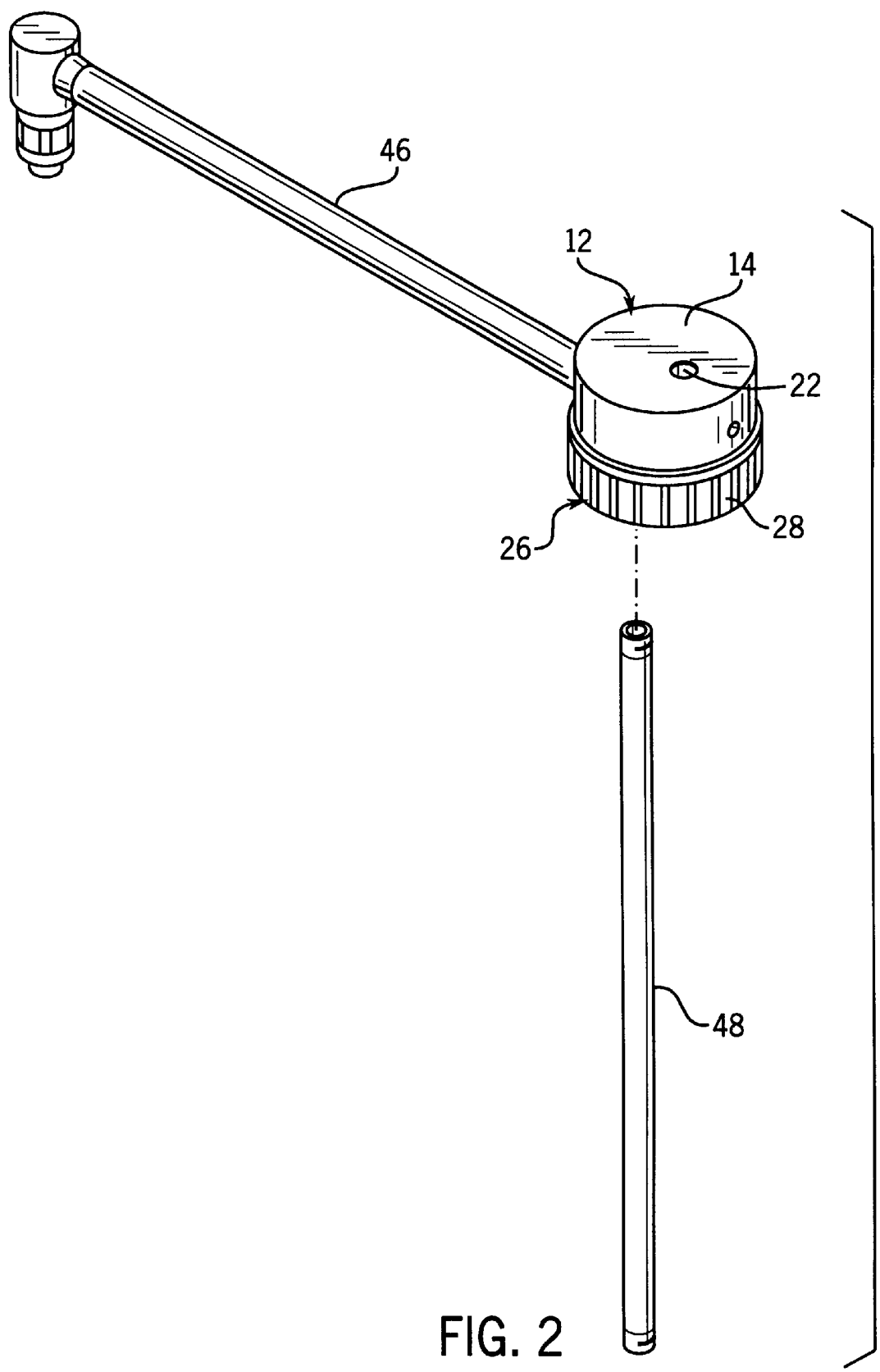
FIG. 2 is a view similar to that of FIG. 1.

As shown in FIG. 2, a first conduit 46, which may be an 8.5×0.25 inch piece of pipe, is fluidly connected with an end of the second bore 24 opposite to the end thereof adjacent the second body 18. An end of the first conduit 46, opposite to an end thereof fluidly connected with the second bore 24, may be fluidly connected with the piece of equipment, such as the analyzer 58, the mixer 66, or both (FIG. 13), to be supplied with first fluid from the first fluid container 62 to be connected with the fluid assembly 10.

Figure 3:
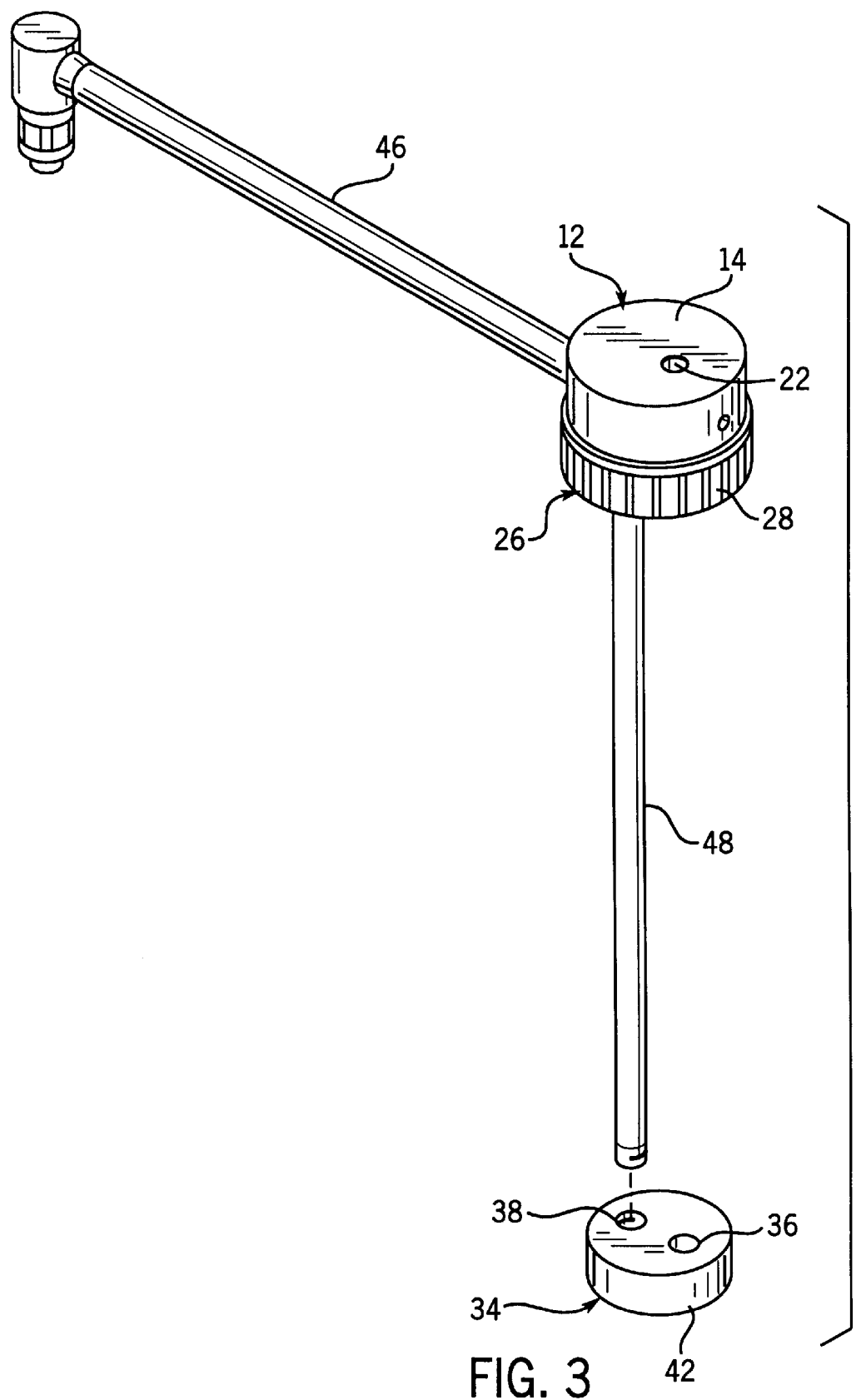
FIG. 3 is a view similar to that of FIG. 2.

An end of a second conduit 48 is fluidly connected with the end of the second bore 24 adjacent the second body 18. As FIG. 3 shows, an opposite end of the second conduit 48 is fluidly connected with an end of the second bore 38 in the second manifold 34 opposite to the end thereof adjacent the first fluid container 62 engaging surface 42. The second conduit 48 may be an ⅛ by 11 inch piece of threaded pipe, possibly made of ⅛ schedule 80 PVC, Type 1, Grade 1 (gray). Thus, a first fluid flow path is formed from the first fluid container 62, to the portion 44, through the second conduit 48, through the second bore 24 and through the first conduit 46 to a particular element, such as the analyzer 58, the mixer 66, or both (FIG. 13), being supplied with first fluid from the first fluid container 32.

Figure 4:
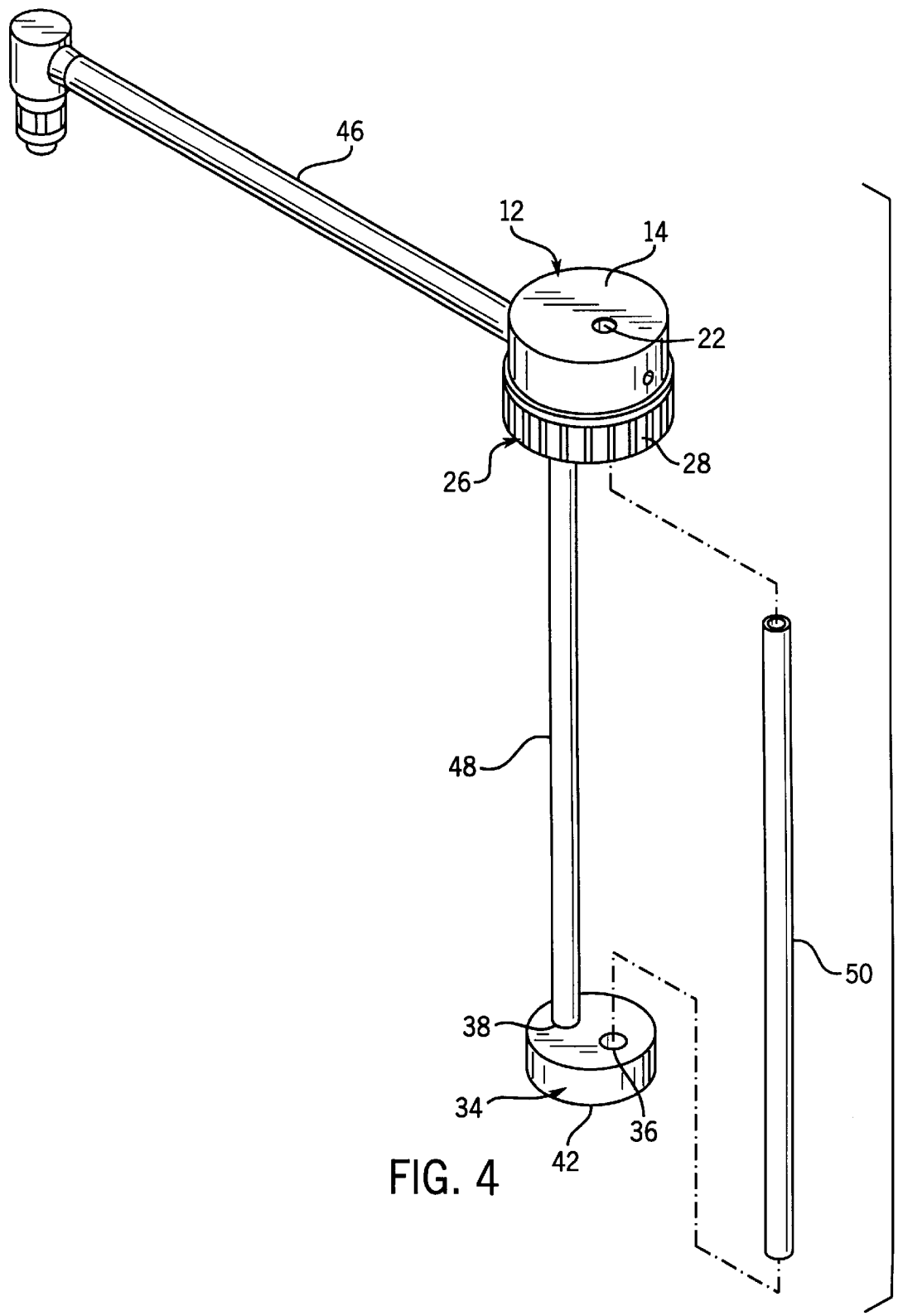
FIG. 4 is a view similar to that of FIG. 3.
Figure 5:
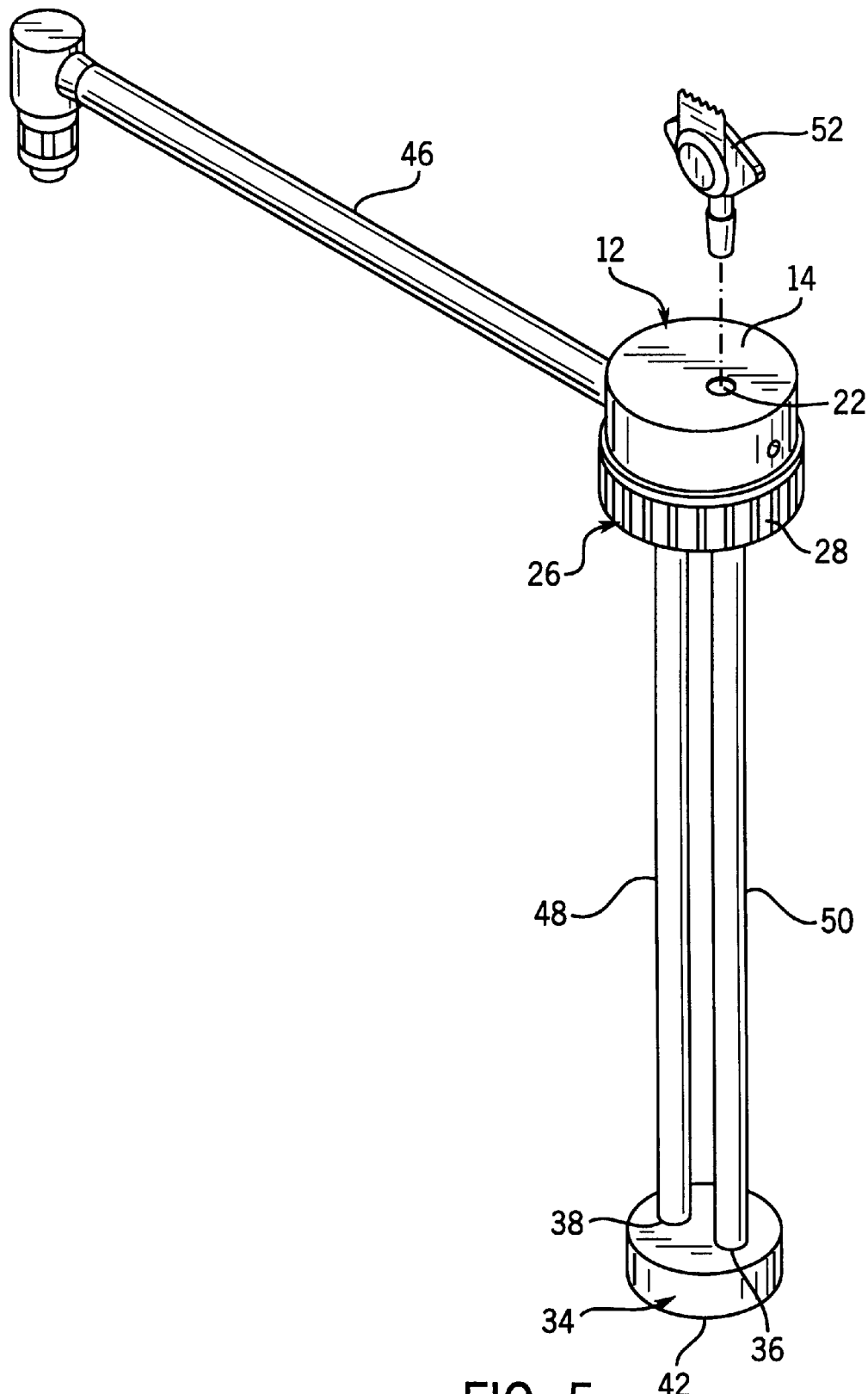
FIG. 5 is a view similar to that of FIG. 4.

A third conduit 50, which may be a 12×⅛ inch piece of pipe (Pomalon thermoplastic fluoropolymer from Freelin-Wade, placed in an oven at approximately 65 degrees Celsius for about 10 minutes to straighten then cooled on a flat surface, for example) is fluidly connected between the first bore 22 in the first manifold 12 and the first bore 36 in the second manifold 34, as illustrated in FIG. 4. Then, as FIG. 5 displays, a pressure transducer or monitor 52 is operatively connected with and substantially fluidly seals at least one end of the first bore 22 in the first manifold 12 adjacent the first body 14. Other fluidic connections of the transducer 52 and a bounded volume of the second fluid are also possible. In a particular embodiment, the pressure transducer 52 may be a signal conditioned, temperature compensated and calibrated, silicon pressure sensor (0–1.45 psi, 0–85 degrees Celsius), such as Catalog No.: MPX5010GP available from Motorola. Connected in this fashion, the pressure transducer 52 monitors pressure within the first bore 22, the third conduit 50, the first bore 36 and the first fluid container 32.

A housing 54 (FIG. 6) is added to the first manifold 12 along with electrical conductor connections 56, which electrically couple the pressure transducer 52 to a suitable control 64, such as a computer and the like having memory running suitable routines. The housing 54 may be substantially cylindrical in shape with a height of about 2.5 inches and an outside diameter of about 0.156 inches. The housing 54 may be made of 1 ¼ schedule 40 PVC, Type 1, Grade 1 (gray).

In one method of use of the fluid assembly 10, a first fluid container 62 (FIG. 13) containing first fluid to be supplied is provided with an opening and a bottom. The fluid assembly 10 is inserted through the opening into an interior of the first fluid container 32. Specifically, the second manifold 34 is placed into the interior of the first fluid container 62 until the container engaging surface 42 engages or otherwise contacts a portion of the first fluid container 32. At the same time, the ring 26 engages a corresponding structure adjacent the opening of the first fluid container 62.

Appropriate force is applied to the knurl 28 on the ring 26 such that the threads 30 on the ring 26 mate with complimentary structures, such as threads and the like, located at the opening of the first fluid container 62. The threads 30 are advanced until the container engaging surface 42 contacts a portion of the first fluid container 62. Such contact can provide an operator with feedback indicating intended installation of the fluid assembly 10 with respect to the first fluid container 62. If the first fluid container 62 were sufficiently flexible, the contact between the container engaging surface 42 and the portion of the first fluid container 62 may cause the portion of the first fluid container 62 to deflect, to flex, to deform or otherwise to move, thereby creating a substantially sloped profile of that portion of the first fluid container 62. Such a sloped profile, in combination with the relevant configuration of the second manifold 34, i.e. the portions 40 and 44 and the container engaging surface 42, may reduce a "dead" volume of first fluid in the first fluid container 62, possibly reducing the dead volume to about 100 μl or about 2% of a volume of the first fluid container 62. Of course, other, possibly smaller dead volumes may be achieved possibly dependent upon a volume of the first fluid container 62, geometry of the first fluid container 62, etc.

Also, as the fluid assembly 10 is installed with respect to the first fluid container 62, a suitable second fluid, such as ambient air and the like, is present in the conduits 46, 48 and 50. Importantly, suitable second fluid is located within the first bore 36, the third conduit 50 and the first bore 22 such that the pressure of that suitable second fluid can be monitored by the pressure transducer 52. Installation of the fluid assembly 10 with the first fluid container 62 causes a volume of suitable second fluid to be trapped and compressed within the first bore 36, the third conduit 50 and the first bore 22 by the first fluid present in the first fluid container 62. In other words, a volume of suitable second fluid within the first bore 36, the third conduit 50 and the first bore 22 is bounded on one side by the first fluid and on an opposite side by the pressure transducer 52. In this fashion, the pressure of the suitable second fluid trapped in the first bore 36, the third conduit 50 and the first bore 22 is proportional to an amount of first fluid in the first fluid container 62.

Assuming that the first fluid container 62 is "full" when the fluid assembly 10 is initially installed, an initial pressure reading taken by the pressure transducer 52. Given that the initial pressure reading represents a "full" first fluid container 62, and given the ability to substantially continuously monitor the pressure of the suitable second fluid trapped inside the first bore 36, the third conduit 50 and the first bore 22, the fluid assembly 10 can be used to monitor a level of first fluid within the first fluid container 62. Specifically, as first fluid is drawn from the first fluid container 62, through the portion 44, the second bore 38, the second conduit 48, the second bore 24 and the first conduit 46 to the particular piece of equipment, such as the analyzer 58, the mixer 66, or both (FIG. 13), supplied with the first fluid, the pressure of the suitable second fluid trapped in the first bore 36, the third conduit 50 and the first bore 22 changes. The change in trapped air pressure is indicative of the volume of first fluid removed from the first fluid container 62. Accordingly, if an initial volume of the first fluid container 62 were known, then, by substantially continuously monitoring the trapped air pressure, the volume of first fluid within the first fluid container 62 is also substantially continuously monitored. Illustrating further by example, a correlation between pressure monitored by the transducer 52, or more specifically a voltage presented by the transducer 52, and volume of first fluid in the container 62 may be determined empirically. In one instance, it may be determined that the correlation is:

0.10 Volts=1000 mL+/−11%

Given this correlation, the following may be specified.

| VOLTAGE | VOLUME |
|---------|--------|
| 0.210 V | 100 mL |
| 0.400 V | 2 L |
| 0.700 V | 5 L |
| 1.200 V | 10 l |

With the determined correlation and related specifics, the voltage presented by the transducer 52 can be sampled periodically, such as about 100 times per second, to substantially continuously monitor volume of first fluid in the container 62. Of course, the voltage can be monitored at any desirable frequency and truly continuous monitoring can be provided by utilizing a suitable analog circuit.

It is important to recognize that the first fluid level in the first fluid container 62 can be monitored substantially continuously by the fluid assembly 10 irrespective of size, configuration or construction of the first fluid container 62. Also, the pressure transducer 52 monitors pressure of the suitable second fluid within the first bore 36, the third conduit 50 and the first bore 22 without coming into contact with the first fluid in the first fluid container 62. This may be important in cases where the first fluid in the first fluid container 62 presents special considerations, such as difficulty of decontamination, cross over, etc.

Once the first fluid level in the first fluid container 62 reaches a certain, predetermined value, as indicated by the pressure in the first bore 36, the third conduit 50 and the first bore 22 monitored by the pressure transducer 52, an operator may be signaled by the control 64 to replace the first fluid container 62 with another, "full" first fluid container 62. The ring 26 is removed from the first fluid container 62 by appropriate application of force to the knurl 28 and the fluid assembly 10 is removed from the first fluid container 62. The fluid assembly 10 is then installed in a new "full" first fluid container 62 as described above. In some implementations of the fluid assembly 10, the connections 56 to the pressure transducer 52 may be removed during installation of the fluid assembly 10 with the first fluid container 62. After installation is complete, the connections 56 may be replaced.

To further illustrate utilization of the fluid assembly 10, the following example is provided. It is to be understood that other utilizations of the fluid assembly 10 are also possible.

In the field of automated medical assay processing, various sample processing protocols may be used to determine patient results. Specific to some chemistries used in some of the sample processing protocols is the use of a buffer reagent that may be utilized to, e.g., rinse sample and reagent probes, wash magnetic particles, dilute samples, flush a relevant fluidics system, etc. Some medical assays can require relatively large amounts, such as greater than about 30 mL, in addition to daily maintenance flushes, of buffer reagent per patient test. This amount is magnified by the number of assays, sometimes about 800 per hour, performed.

These relatively large amounts of buffer reagent may be rather expensive to provide, as shipping large volumes of fluid over large distances may be costly. Such expenses may contribute to rising costs in diagnostic health care for providers and patients alike. In an effort to address this, it is possible to provide, for example, a soluble concentrate form of the reagent buffer. In this case, the reagent buffer concentrate may be equivalent to the first fluid discussed earlier.

The concentrate or first fluid may be provided to a user in need of mixing with a third fluid. In one exemplary embodiment, the first fluid may need a 9:1 third fluid (e.g. water)—concentrate dilution prior to use on-board an analyzer 58 or plurality of analyzers 58. The fluid assembly 10 and the mixer 66, along with other associated elements, such as valves, pumps, fluid conveying conduits and the like, utilized in performing the dilution may be provided in a substantially integrated fashion, such as automatic module or apparatus 60, shown by dotted lines in FIG. 13.

To utilize the apparatus 60, a user makes a fluid connection to a source 68 that supplies third fluid, such as purified water and the like. In a particular embodiment, the source 68 may provide about 1.53 L/min NCCLS II type water substantially within the range of about 5 to about 100 psig and at a temperature between about 5 and about 37 degrees Celsius. To make this connection, in an exemplary utilization, about 10 feet of approximately ⅜" ID tubing may be used with appropriate connectors compatible with the apparatus 60 and the source 68.

With the fluid connection between the apparatus 60 and the source 68 being made, a user loads a container 62 containing first fluid (i.e. concentrate) onto the apparatus 60. Then, the user installs the fluid assembly 10 with the container 62 following the steps described above. Specifically, the fluid assembly is inserted into the container 62, the threads 30 are screwed onto a mating portion of the container 62, and the fluid assembly 10 is connected both fluidly, by first conduit 46, and electrically, by connections 56, to the apparatus 60. In this manner, the apparatus 60 provides both first fluid (concentrate) delivery and first fluid, concentrate and diluted, inventory monitoring functions. In some embodiments, the apparatus 60 may be provided with a pressurized drain and/or gravity drain ports which can fluidly connect relevant portions of the apparatus 60 to a suitable drain. Then, a series of tubing 72, possibly configured to form a manifold designed to balance first fluid diluted with third fluid flow to multiple analyzers 58, may be constructed and fluidly connected.

In some embodiments, the apparatus 60 may be connected with the control 64 by means of an RS232 port on the apparatus 60. This way, the control 64 can determine when and how the apparatus 60 operates, i.e. turns on and off, etc. Illustrating by example, if any analyzer 58 needs first fluid diluted with third fluid, the control 64 allows delivery of that diluted fluid to begin by opening suitable valve(s), not shown for clarity, which are fluidly connected in series with relevant portions of the apparatus 60. After a desired fluid flow path among the apparatus 60 and the tubing 72 is opened, the control 64 can send a command signal for the apparatus 60 to turn on and commence operation, that is diluting first fluid with third fluid. If all analyzers 58 were determined to be full (a tank for diluted first fluid contained on the analyzer 58 is full), the control 64 can send a command signal to turn the apparatus 60 off and cease dilution of first fluid with third fluid and delivery of the diluted first fluid through the tubing 72. Electrical power is operatively connected to the apparatus 60 with an appropriate power cord provided. Incoming electrical power may be compatible with various worldwide requirements. In some embodiments, components on the apparatus 60 may be driven by about 36 V and about 5 V supplies.

Figure 14:
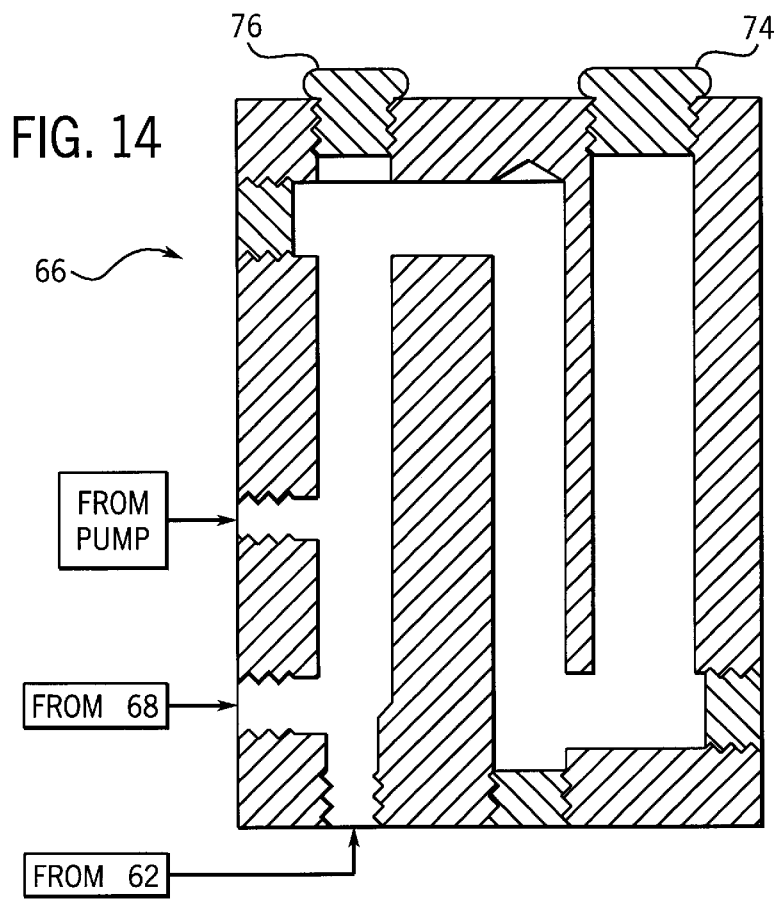
FIG. 14 is a sectional view of a portion of the system of FIG. 13.

With appropriate connections being made, a user can operate the apparatus 60. After receiving a suitable signal from the control 64 to turn on, incoming third fluid, e.g. water, from the source 68 is flushed to a drain for a predetermined time period, such as approximately three seconds, and is measured for resistivity by a sensor 74 fluidly connected with the mixer 66 (FIG. 14). Alternatively, another sensor, possibly fluidly associated with the source 68 or fluidly associated conduits, may be used to determine resistivity of the incoming third fluid. If resistivity measured by either sensor were greater than about 1 M Ohm, then the third fluid is routed to a pump, such as a positive displacement pump and the like, which delivers third fluid from the source 68 to the mixer 66. If measured resistivity is less than about 1 M Ohm, the flow of the third fluid is continued to be routed to drain and sampled, such as about every three seconds, for resistivity. If resistivity is not within an acceptable range after a certain, predetermined number, such as three, readings, a third fluid quality error may be conveyed to the user, such as by activating a corresponding indicator, such as a light emitting diode and the like, located at an appropriate location, such as on a keypad associated with the control 64 and/or the apparatus 60 or the like.

Incoming third fluid may also be checked for adequate pressure, such as by sensor 76. Alternatively, another sensor, possibly fluidly associated with the source 68 or fluidly associated conduits, may be used to determine pressure of the incoming third fluid. In some cases, a third fluid pressure of less than about 5 psig may be determined to be inadequate. If incoming third fluid pressure is inadequate, then the apparatus 60 may be shutdown and an appropriate error, such as activating a low pressure indicator on the keypad, may be conveyed to the operator.

Upon loading a new, full container 62 of first fluid, the user can instruct the apparatus 60 to perform a first fluid inventory level calibration. The transducer 52 on the fluid assembly 10 can deliver a baseline voltage to suitable software, running on the control 64 or on the apparatus 60, that correlates this baseline voltage with the container 62 being 100% full. The software monitors voltage changes and based on the voltage changes, reports information indicative of a first fluid level within the container 62 to the user, such as via light emitting diodes or other indicators located on the keypad and the like. In a specific employment, when first fluid remaining in the container 62 is less than about 2 percent of the volume of the container 62, then the user may be notified and the apparatus 60 may discontinue operation until a new container 62 is loaded.

In a particular embodiment, from the container 62, first fluid is routed to the pump that delivers first fluid to the mixer 66. Third fluid may be routed from the source 68 to a similar pump for delivering third fluid to the mixer 66. The first and third fluid pumps may be driven by a single motor operating at a substantially constant speed geared to drive the two pumps such that downstream first fluid to third fluid ratio is about 1 to about 9.

In some instances, given characteristics of the first fluid (it may be a salt concentrate), the first fluid pump may be susceptible to salt build up. To deal with this, a portion of the third fluid may be routed to the first fluid pump for allowing substantially continuous flushing or cleaning of relevant first fluid pump surfaces. This portion of first fluid may generate a first fluid pump flush bi-product. The mixer 66 can accept not only the first and third fluids, but also the first fluid pump flush bi-product and provide mixing of those fluids to create a ready-to-use diluted first fluid.

In some embodiments, the sensors 74 and 76 may be used to provide quality control for the mixing of the first fluid with the third fluid. If pressure monitored by sensor 76 were determined to be undesirable, such as greater than about 15 psig, to deliver to downstream analyzers 58, then the apparatus 60 may shutdown and provide feedback to the user, such as by activating an outgoing pressure indicator. If efficacy of the diluted first fluid is not within acceptable limits, such as having a conductivity substantially within the range of about 14.74 to about 17.76 mS/cm, then the diluted first fluid may be routed to drain. Conductivity of the diluted first fluid may be sampled periodically, such as about every three seconds, and may continue to be routed to drain for another time period, such as that corresponding to about three additional readings, prior to shutdown of the apparatus 60. If a shutdown occurs, a high or low conductivity indicator associated with the control 64 or the apparatus 60 may be activated.

If conductivity is within an acceptable range, then diluted first fluid may be routed to the tubing 72. The tubing 72 is connected to one or more analyzers 58. The control 64 accepts a signal from each analyzer 58 that indicates on-board diluted first fluid level. From this information, it is determined when the apparatus 60 turns on and off. This logic can provide continuous delivery of diluted first fluid to multiple analyzers 58 upon demand.

In the above-described fashion, the apparatus 60 may reduce associated manual labor, may provide substantially continuous buffer capacity to the analyzers 58, may monitor first, third and/or mixed fluid quality, temperature, resistivity, conductivity, etc., can function with various fluid temperatures and pressures, and may have error self-diagnosing capability.

In some embodiments, the apparatus 60 may include a drip pan integrated with a fluid flood detector fluidly associated with the first and third fluids to aid in fluid flood prevention. This fluid flood detector may comprise a pair of separated electrical conductors, a conductive path between which may be supplied by at least one of the first fluid, the third fluid, and the third fluid mixed with first fluid. Conductivity between those separated electrical conductors may be monitored to determine presence of at least one of the first fluid, the third fluid, and the third fluid mixed with first fluid to indicate a flood or leak or other unintended release of that fluid.

A RS232 field service interface and customer keypad feedback may be provided with the apparatus 60 to diagnose errors. The apparatus 60 may also run an automatic decontamination mode.

What is claimed is:

1. A fluid assembly insertable into a container holding a first fluid to be supplied to a diagnostic instrument, the fluid assembly comprising:
   (a) a first element;
   (b) a second element;
   (c) a first conduit fluidly connected directly to the first element and the second element such that the first fluid in the container moves through the first conduit towards the diagnostic instrument;
   (d) a second conduit containing a second fluid fluidly connected directly to the first element and the second element; and
   (e) a pressure transducer fluidly connected with the second conduit such that the second fluid is bounded within the second conduit by the first fluid and the pressure transducer, the pressure transducer monitoring pressure of the second fluid to indicate a volume of the first fluid in the container.

2. A fluid assembly as defined in claim 1 further comprising:
   (f) a ring movably disposed on the first element, the ring having a structure which removably mates with a corresponding structure on the container to removably join the fluid assembly and the container.

3. A fluid assembly as defined in claim 1 wherein the second element includes a container engaging surface engagable with a portion of the container, the container engaging surface engaging the portion of the container such that the portion of the container moves to reduce a dead volume of the first fluid within the container.

4. A fluid assembly as defined in claim 1 wherein the second element includes a container engaging surface engagable with a portion of the container to reduce dead volume of the first fluid within the container.

5. A method of using a fluid assembly insertable into a container of first fluid to be supplied to a diagnostic instrument, the method comprising the steps of:
   (a) fluidly connecting a first element directly to a second element by a first conduit;
   (b) fluidly connecting the first element directly to the second element with a second conduit containing a second fluid;
   (c) fluidly connecting a pressure transducer with the second conduit;
   (d) inserting the first element, the second element, the first conduit and the second conduit into the container such that first fluid moves through the first conduit towards the diagnostic instrument;
   (e) bounding the second fluid in the second conduit by the first fluid and the pressure transducer; and
   (f) monitoring pressure of the second fluid with the pressure transducer to indicate a volume of first fluid in the container.

* * * * *